(12) United States Patent
Knefelkamp et al.

(10) Patent No.: US 9,031,565 B2
(45) Date of Patent: May 12, 2015

(54) STATIC MESH NETWORK, AIRCRAFT AND METHOD FOR DATA COMMUNICATION (75) Inventors: Sven Knefelkamp, Wedel (DE); Fabian Binternagel, Bad Zwischenahn (DE)

(73) Assignee: Airbus Operations GmbH, Hamburg (DE)

(*) Notice: Subject to any disclaimer, the term of this patent is extended or adjusted under 35 U.S.C. 154(b) by 292 days.

(21) Appl. No.: 13/704,076

(22) PCT Filed: Jun. 27, 2011

(86) PCT No.: PCT/EP2011/060715
§ 371 (c)(1),
(2), (4) Date: Dec. 13, 2012

(87) PCT Pub. No.: WO2012/000936
PCT Pub. Date: Jan. 5, 2012

(65) Prior Publication Data
US 2013/0109424 A1 May 2, 2013

Related U.S. Application Data (60) Provisional application No. 61/359,019, filed on Jun. 28, 2010.

(30) Foreign Application Priority Data

Jun. 28, 2010 (DE) .......................... 10 2010 030 585

(51) Int. Cl.
*H04W 40/00* (2009.01)
*H04W 84/18* (2009.01)
(Continued)

(52) U.S. Cl.
CPC ............ *H04W 84/18* (2013.01); *H04B 7/18506* (2013.01); *H04W 4/04* (2013.01); *H04W 16/32* (2013.01); *H04W 84/00* (2013.01)

(58) Field of Classification Search
USPC .............. 455/3.01–3.06, 41.1–41.3, 443–449
See application file for complete search history.

(56) References Cited

U.S. PATENT DOCUMENTS 7,496,361 B1    2/2009 Mitchell et al.
2002/0071478 A1*  6/2002 Cornwall et al. ............. 375/132
(Continued)

FOREIGN PATENT DOCUMENTS

DE    60314993 T2   5/2008
EP     1739993 A1   1/2007
(Continued)

OTHER PUBLICATIONS

The International Search Report for PCT Application No. PCT/EP2011/060715, dated Dec. 23, 2011.
(Continued)

*Primary Examiner* — Fayyaz Alam
(74) *Attorney, Agent, or Firm* — Westman, Champlin & Koehler, P.A.

(57) ABSTRACT

The present invention discloses a static mesh network in or for a cabin of a vehicle, in particular an aircraft, the cabin having a predetermined, known cabin layout, comprising at least three different network levels which are arranged hierarchically in relation to one another, respectively adjacent network levels in the hierarchy being in wireless communicative connection with one another, and comprising a plurality of network nodes which operate mutually independently and of which the position in the cabin layout is fixedly predetermined by the configuration of a respective network node, the network nodes within a respective network level having an equal logic. The present invention furthermore discloses an aircraft and a method for data communication using such a network in an aircraft.

10 Claims, 3 Drawing Sheets (51) Int. Cl.
*H04B 7/185* (2006.01)
*H04W 16/32* (2009.01)
*H04W 4/04* (2009.01)
*H04W 84/00* (2009.01)

(56) References Cited

U.S. PATENT DOCUMENTS

2003/0114178 A1 6/2003 Chapelle et al.
2005/0074019 A1 4/2005 Handforth et al.
2005/0216938 A1 9/2005 Brady, Jr. et al.
2009/0296668 A1* 12/2009 Capone et al. ............... 370/337

FOREIGN PATENT DOCUMENTS

| | | |
|---|---|---|
| EP | 1835662 A1 | 9/2007 |
| EP | 1871123 A1 | 12/2007 |
| EP | 1933534 A1 | 6/2008 |
| WO | 03032503 A2 | 4/2003 |
| WO | 2007136339 A2 | 11/2007 |

OTHER PUBLICATIONS

The Office Action for DE Application No. 102010030585.5, dated Jun. 17, 2011.

* cited by examiner

FIG 2

STATIC MESH NETWORK, AIRCRAFT AND METHOD FOR DATA COMMUNICATION

CROSS-REFERENCE TO RELATED APPLICATION

This Application is a Section 371 National Stage Application of International Application No. PCT/EP2011/060715, filed Jun. 27, 2011 and published as WO 2012/000936 A2 on Jan. 5, 2012, in German, the contents of which are hereby incorporated by reference in their entirety.

The invention relates to a static mesh network in or for a cabin of a vehicle, in particular in or for an aircraft cabin. The present invention further relates to an aircraft and a method for data communication using a network of this type.

The present invention belongs to the field of wireless communication networks, in particular in the field of aviation. Wireless networks are well known in various applications. Wireless network architectures of this type are generally based on what is known as a star topology, in which there is a single central master, for example a WLAN access point, along with various slaves or clients connected to this master. If the central master of the wireless network fails, the entire wireless network is unable to function, or at least has a greatly reduced functionality. As a result, wireless networks of this type which are based on a star topology are not very robust. The data distribution in wireless networks of this type is also very ineffective, since the master always has to distribute the data to the various clients in succession.

For these reasons, what are known as mesh networks, also referred to as ad-hoc networks, are increasingly being used as wireless communication networks. A mesh network should be understood to mean a radio network which connects a plurality of network nodes, that is to say terminals in a telecommunications network, to a meshed network. Unlike in communication networks having a central distributor, in a mesh network data are passed from one network node to another network node until they have reached the actual receiver or addressee. Special routing methods provide that the mesh network constantly adapts to new circumstances, for example if network nodes are added, are removed or fail. The data load is thus generally better distributed in the communication network than in communication networks which are based on a central distributor, in such a way that a mesh network is also very efficient. The use of a mesh network provides a very reliable variant of wireless data communication, since if a network node fails, communication is still possible by diverting the data communication via other network nodes. Finally, a mesh network of this type is also very cost-effective because of the low hardware requirements.

The present invention and the problems on which it is based are described in the following with reference to a mesh network in an aircraft cabin, and in particular in connection with what is known as an in-flight entertainment (IFE) communication system, but without limiting the invention thereto. "IFE systems" is the umbrella term for entertainment systems which are available to passengers in a commercial aircraft during the flight. IFE systems of this type comprise electronic devices which have individual screens for each passenger, which can be installed in the rear face of the respective seat in front, the wall or for example the armrest. By means of these individual screens for each passenger, the passenger can choose between a number of films and programmes, for which he can freely determine the start time, games, music, functions from the passenger service system (PSS) etc.

Current IFE systems used in aircraft are based on wired data communication, and therefore have a complex, wired communication network. This type of data communication connection, using wired network nodes within an IFE system, has proved itself in the past and operates very reliably. However, in modern aircraft, such as commercial aircraft, there is always the need for weight-optimised solutions, which also do not stop in the comfort region and in particular in the cabin region of the aircraft. Moreover, in particular in data communication networks, there is always an interest in flexible solutions to take into account changes in the layout which typically take place in the cabin region of an aircraft. In particular in commercial aircraft, which are becoming ever larger, for example commercial aircraft having a capacity of 500 or more passengers, a particular requirement is on the one hand to couple the various terminals for the individual passengers flexibly to the IFE system, and on the other hand to provide highly dependable and thus reliable data communication.

US 2005/0074019 A1 discloses a wireless mesh network having a plurality of levels, and a data communication method in which data communication between network nodes of different levels of this wireless ad-hoc network is to be made possible. In the mobile ad-hoc network disclosed in US 2005/0074019 A1, the individual network nodes, which are treated equally to one another in the different levels, are mobile. Moreover, the network nodes are dynamic, that is to say they do not have a fixed configuration. Rather, the arrangement of the network nodes is variable and has to be re-established in each case for data communication, in other words configured, and this entails a considerable configuration effort in the data communication as a whole.

Against this background, the object of the present invention is to provide improved and in particular flexible data communication, particularly in an aircraft.

According to the invention, this object is achieved by a network having the features of claim 1.

Accordingly, the following is provided:

A static mesh network in or for a cabin of a vehicle, in particular an aircraft, the cabin having a predetermined, known cabin layout, comprising at least three different network levels which are arranged hierarchically in relation to one another, respectively adjacent network levels in the hierarchy being in a wireless, preferably bidirectional communicative connection with one another, comprising a plurality of network nodes which operate mutually independently and of which the position in the cabin layout is fixedly predetermined by the configuration of a respective network node, the network nodes within a respective network level having an equal logic.

An aircraft, in particular a passenger aircraft, comprising an aircraft cabin which is equipped with an in-flight entertainment means, the in-flight entertainment means having a network according to the invention.

A method for data communication and in particular for wireless data transmission between the network nodes of a static, hierarchical mesh network, constructed with a dynamic configuration and having at least three network levels, in a vehicle, comprising the steps of: (a) providing data which are coupled into a highest network level via an external interface and which are intended to be transmitted to network nodes of a lowest network level; (b) transmitting the data to a network node, which is adjacent to the highest network level, of a central network level, until said node has received all of the data; (c) transmitting the data from the network node of the central network level to at least one network node, which is adjacent to the aforementioned node, of the same central network level, until said adjacent network node has received all of the data; (d) repeating step (c) until all of the network nodes of the central network level have received the data; (e) simultaneously transmitting the data from the network nodes of the central network level to the network nodes which are respectively associated with said nodes in the lowest network level.

The finding on which the present invention is based is that in aircraft, which are becoming ever larger, and in particular in jumbo jets, the hardware components within an IFE system are becoming more and more complex, and this entails in particular an increasing gain in weight. The present invention is therefore based on the idea of replacing the fixed wiring known in previous, conventional data communication networks in aircraft and the associated hardware complexity with a static mesh network having fixedly configured network nodes. Mesh networks of this type are radio-based communication networks, which may intercommunicate via wireless communication connections, depending on the application. This makes it possible to achieve a significant weight reduction in the implementation of communication networks of this type in aircraft, and this is of interest and of advantage in aircraft in particular, since weight reduction is of vital importance in this context.

By contrast with conventional wireless communication networks, which are based on a star topology, according to the invention, the mesh network is provided with a hierarchical architecture having different network levels.

According to the invention, the network nodes of different network levels are not treated equally, that is to say the network nodes of higher-ranking network levels are for example more dominant than lower-ranking network nodes. The different network nodes within the different network levels are interconnected via configurable communication connections, in such a way that very robust data communication is provided between the individual network nodes, and said communication remains functional even if one or more of the network nodes within the mesh network fails.

A further advantage of providing a mesh network according to the invention is that a network architecture is provided which is virtually without infrastructure and in particular is without a server, and with the exception of the hardware for the network nodes, said architecture requires a minimum of hardware and connecting lines, and is therefore very cost-effective and weight-reducing. Moreover, the wireless communication connections result in high flexibility in the construction of the static mesh network, which can be adapted very flexibly to a change in the layout of the network nodes, in particular to a change in the layout of the aircraft cabin, depending on requirements and application.

In the context of the present description, a network node should be understood to be an electronic terminal having mobile communication capabilities in a communication network, such as, in the case of an aircraft, an individual multimedia device for each passenger, a monitor, a personal television device (PTV device), an individual computer for each passenger, a mobile telephone, a personal digital assistant (PDA), a notebook, or any other electronic component having mobile communication capabilities. A network node is thus an umbrella term for a device which interconnects two or more transmission paths, which may be wired or wireless, of a communication network. A feature shared by network nodes of this type is the addressability in each case.

Advantageous configurations and developments of the invention may be taken from the further dependent claims in combination with the figures of the drawings.

In a preferred configuration, the positions of the individual network nodes of the static network can be configured by way of the known cabin layout, and can thus be constructed so as to be alterable. A static network should be understood to be a network of the type which does not always have to be re-established and reconfigured, as is the case for mobile networks. This is because in a static network, the initial configuration of the network and the layout of the environment, for example of an aircraft cabin, are known. In a local change or shift, the new positions of the network nodes are still established by way of the known layout, and therefore do not always have to be reconfigured. Thus, by way of a known layout, for example the known cabin layout, there is already a predetermined configuration of these network nodes and thus of the entire static mesh network. Complex hardware for reconfiguration in the case of a change in the individual network nodes is thus unnecessary, and this leads to a much more simplified network architecture and to far more rapid and above all simplified communication.

In a preferred configuration, the network nodes of different network levels are physically identical, that is to say the network nodes are typically formed so as to be identical in construction and/or typically each have the same functionality. However, network nodes of different network levels are logically different, i.e. network nodes of different network levels are not treated equally to one another. Preferably, the logic, in other words the rank of the network nodes, can be adjusted, for example as a function of the allocation to a respective network level, for example by way of the data communication protocol.

In a preferred configuration, the network nodes in data-communicating connection with one another of at least one and preferably all network levels form a wireless backbone network. It would also be conceivable for merely the network nodes of the first and/or the second network level, in other words the highest network level and/or the highest two network levels, to be formed as a backbone network. "Backbone network" or "base network" refers to a connecting core region of a communication network having very high data transfer rates.

In a preferred configuration, network nodes in data-communicating connection with one another form a chain-like data communication connection in each case. The network nodes of the first network level are arranged as centrally as possible in a respective chain-like data communication connection. Preferably only the network nodes within the first and second network levels form a chain-like data communication connection. This makes very rapid data communication possible. In particular, in this way more distant network nodes are also reached very rapidly. Moreover, it is of course advantageous if, when a network node within a chain-like data communication connection fails, a bridge over the respectively failed network node is produced.

In a preferred configuration, at least one network node of a network level which is subordinate in the hierarchy always has a wireless data-communicating connection to at least two different network nodes of a network level which is correspondingly superordinate in the hierarchy. The mesh network according to the invention thus comprises network nodes of the type of which the functionality can be taken over by other network nodes as required, and this results in redundancy. If a network node fails, even if this network node is arranged in a higher or even in the highest network level, the functionality thereof, namely generating, receiving and transmitting data, is taken over for example by an adjacent network node, which need not necessarily be arranged in the same network level. This results in very good safeguarding against failure, and thus in a high degree of reliability of the data communication.

In a preferred configuration, a first, highest network level comprises two and preferably a plurality of mutually separate, that is to say non-interconnected, network nodes, which act for example as gateway nodes. This is advantageous in particular if for example the entire mesh network comprises a plurality of different network levels and in particular a plurality of different network nodes, above all in the second network level below. In particular if the second network level comprises a plurality of base network nodes, it is advantageous to provide two or more gateway network nodes, so as to provide more rapid, more effective, and above all more robust data transmission. This ensures that if a gateway network node fails, effective and reliable data communication with systems which are external to the network is still possible. In the case of an IFE system, this means that it is still possible for a passenger to access the terminal assigned to him, for example a personal television, even if one terminal has failed. In conventional IFE systems, a whole group of seats generally fails in this case, since the seats in one group of seats are fixedly wired to one another, and there is only a single interface to the communication network. The approach according to the invention of a mesh network prevents this, and thus also increases reliability at the seat level.

In a preferred configuration, the mesh network comprises three or more different network levels, a first, highest network level comprising at least one gateway network node, which acts as a gateway and via which the mesh network can be coupled, in a wired or wireless manner, to systems which are external to the network. The mesh network further comprises a second, central network level having a plurality of base network nodes for transmitting received data to network nodes of other network levels or the same network level. A third, lowest network level comprises a plurality of end network nodes, which each form wireless data-communicating connections with at least one base network node of the second network level. The network nodes, which can each be brought into data-communicating connection with the network nodes, form the end of the mesh network chain. The base network nodes are configured so as to produce a data-communicating connection to the gateway network nodes, on the one hand, and to the network nodes, on the other hand. In a particularly preferred configuration, the network nodes of the first, highest network level act as a gateway to the network nodes of the second network level below and to other interface systems which are not necessarily part of the mesh network. The gateway network node or nodes are preferably arranged in the chain-like data communication connection as centrally as possible within the highest network level. This makes possible very effective and rapid data distribution, of data which are transmitted via the gateway network nodes, to the network nodes of the second network level arranged below.

In a preferred configuration, the different end network nodes of the third network level are evenly distributed in the cabin layout. The base network nodes of the network levels which are arranged above within the cabin layout are arranged in such a way that a data-communicating connection between the base network nodes and the end network nodes can be constructed with a minimum number of base network nodes. This can be provided for example by way of a zigzag, spiral, wavy, or even a concertina configuration of the data communication produced by the base network nodes. The number of base network nodes used in this context is basically dependent on the number and the layout of the end network nodes within the portion and in particular within the aircraft cabin.

In a preferred configuration, the different network nodes each have an independently operating transceiver for receiving and/or transmitting data. An independently operating transceiver of this type is configured to receive and transmit data, and optionally to process the data within the network nodes using a corresponding program-controlled means, independently of the transceivers of adjacent network nodes.

In a preferred configuration, at least one gateway network node additionally comprises an interface via which wired or wireless data communication can be produced using communication means external to the network. This interface may preferably also be wireless, but wired data communication would also be conceivable.

In a preferred configuration, the network nodes are arranged in a hardware means of the in-flight entertainment means, in particular in a PTV (personal TV) means or a multimedia means. A multimedia means of this type may for example be an overhead multimedia means provided for a plurality of seats in the aircraft cabin. A personal television means may for example be a monitor, computer, LCD screen, or very generally speaking a seat display unit (SDU), which is provided in the backrest of the seat in front.

In a preferred configuration, a PSS (passenger service system) means is provided. The in-flight entertainment means can be brought into data-communicating connection with the PSS means via the gateway network nodes. A PSS means of this type is configured in such a way that general requests, such as a flight attendant call and a reading light, or items of flight-specific information can be transmitted to the terminals of the in-flight entertainment means. Items of flight-specific information of this type, which passengers wish to call up by way of the in-flight entertainment system, are for example the precise position, height and speed of the aircraft and the like.

The above configurations and developments can be combined with one another in any desired manner, within reason. Further possible configurations, developments and implementations of the invention also comprise combinations which have not been explicitly mentioned of features of the invention which are disclosed above or in the following in relation to the embodiments. In particular, in this context the person skilled in the art will also add individual aspects, as improvements or supplements, to the respective basic form of the present invention.

The present invention is described in greater detail in the following by way of the embodiment shown in the schematic figures of the drawings, in which.

In the figures of the drawing, like and functionally equivalent elements, features and components are provided with like reference numerals in each case, unless stated otherwise.

Figure 1:
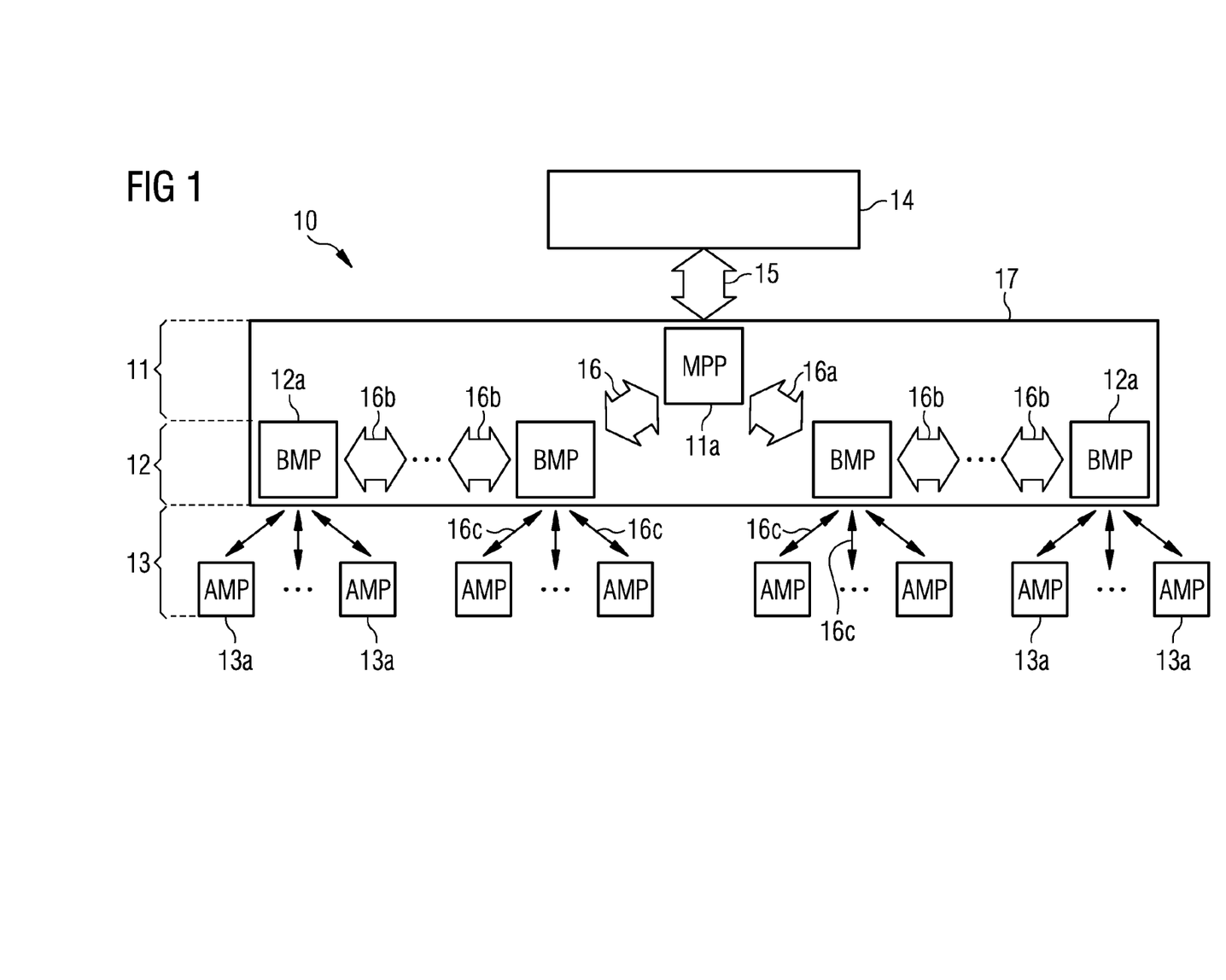
FIG. 1 is a block diagram showing the architecture of the mesh network according to the invention.

FIG. 1 is a block diagram showing the architecture of the mesh network according to the invention. In FIG. 1, reference numeral 10 denotes a mesh network according to the invention. In the following, it is to be assumed that the mesh network 10 according to the invention is provided in an aircraft, and in particular in the aircraft cabin thereof. The mesh network 10 provides data communication, and for this purpose the mesh network is coupled to other systems 14 of the aircraft via an interface 15. This interface 15 is preferably also a wireless communication connection, but it would also be conceivable for this interface 15 to be a wired interface.

The mesh network 10 according to the invention is formed as a static ad-hoc network, which has a hierarchical network architecture. The hierarchically constructed mesh network 10 comprises a plurality of network levels 11, 12, 13 of ascending hierarchy and thus increasing in rank, arranged above one another. The mesh network 10 further comprises a plurality of network nodes 11a, 12a, 13a, which are arranged in the different network levels 11, 12, 13. In the present case, a total of three network levels 11, 12, 13 is provided.

The first, highest network level 11 is coupled via the interface 15 to aircraft systems 14 which are external to the mesh network. In the present embodiment, this highest mesh network level 11 comprises, merely by way of example, a single gateway network node 11a. The mesh network 10 further comprises a second, central network level 12, which comprises a plurality of different base network nodes 12a. The mesh network 10 further comprises a third, lowest network level 13, which comprises a plurality of end network nodes 13a. The second network level 12 is arranged between the first and third network levels 11, 13, and serves to transmit data of the first network level 11 to the third network level 13 and vice versa. The second network level 12 thus acts to some extent as a data buffer.

In the following, the functionality of the different network nodes 11a, 12a, 13a and the corresponding network levels 11, 12, 13 will be discussed in brief.

Each network node 11a, 12a, 13a of the mesh network 10 is configured to receive or to transmit data. Moreover, each network node may also be configured to produce data or to process data so as subsequently to transmit these processed data. These data may comprise any conceivable items of digital information. In the specific case of the IFE system, these data may for example be control commands of a passenger service system (PSS), which are received via the communication means of the aircraft cabin. Control commands of this type may for example be activating a passenger lighting system, calling a flight attendant and the like.

The gateway network nodes 11a, which are also referred to as MPP (mesh point portal) network nodes, act as a gateway to the second network level 12 and as an interface to systems 14 which are external to the network, such as the PSS system. The base network nodes 12a, which are also referred to as BMP network nodes (backbone mesh points), are in data-communicating connection both with the base network nodes 11a of the same second network level 12 and with the end network nodes 13a of the first and third network levels 11, 13. In the embodiment shown in FIG. 1, the gateway network nodes 11a and base network nodes 12a are arranged in a backbone communication chain 17, and in this case the gateway network node 11a is arranged substantially in the central region of this backbone communication chain. The end network nodes 13a, which are also referred to as AMP network nodes (associated mesh points), form the end of the network 10.

The wireless data communication connection between the gateway network nodes 11a and the respectively adjacent base network nodes 12a within the backbone communication chain 17 is denoted by reference numeral 16a. Moreover, these base network nodes 12a are also connected via corresponding wireless communication connections 16a to correspondingly adjacent base network nodes 16b within the same backbone communication chain 17. Finally, the base network nodes 12a are also connected via wireless communication connections 16c to respective end network nodes 13a of the lowest network level 13.

For data communication of the different network nodes 11a-13a, known wireless communication protocols may be used, such as a standard from the IEEE 802.11 family, and in particular the standard IEEE 802.11n or IEEE 802.11s. A suitable combination of these communication standards makes possible a wireless, hardware-reduced communication infrastructure for this mesh network 10, since each of the terminals and thus each network node 11a-13a already has the necessary functionality as regards receiving and transmitting.

Figure 2:
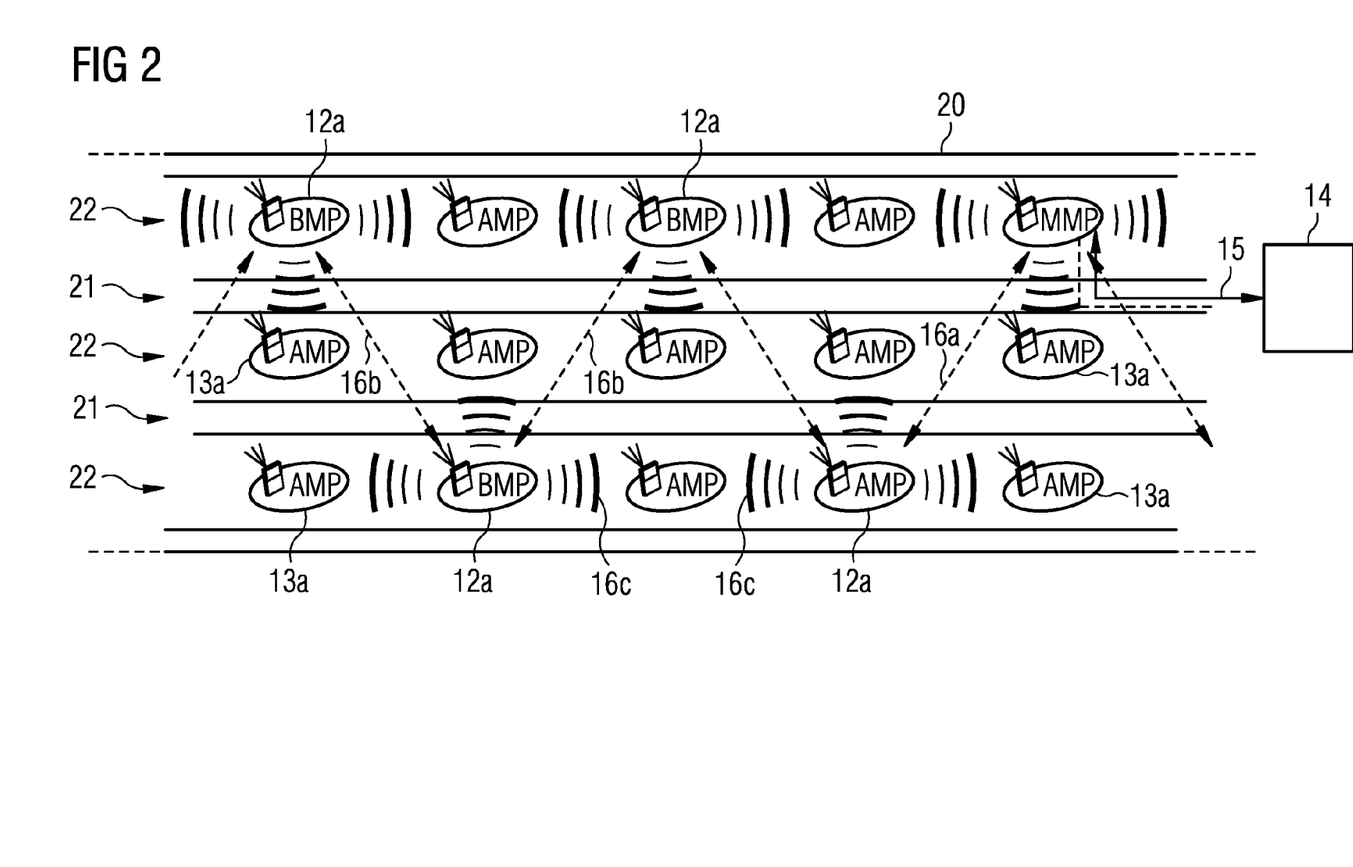
FIG. 2 is a block diagram showing a schematic representation of an aircraft cabin having a mesh network according to the invention provided therein.

FIG. 2 is a block diagram showing a schematic representation of an aircraft cabin having a mesh network according to the invention provided therein. In FIG. 2, a portion of an aircraft cabin is denoted by reference numeral 20. This aircraft cabin 20 comprises a plurality of seats, arranged side by side and merely shown schematically, for the aircraft passengers, these seats being arranged in a regular manner which is known per se, in front of one another and side by side. In the present case, the aircraft cabin has a seat layout with two aisles between the aircraft seats (known as a twin-aisle fuselage). The two central aisles are denoted by reference numeral 21, and the respective rows of seats are denoted by reference numeral 22.

It is assumed that a terminal 11a, 12a, 13a, for example what is known as an SDU means or a PTV means, is assigned to each aircraft seat. These terminals are typically arranged in the backrest of the respective seat in front in a known manner. In FIG. 2, for the sake of improved clarity, only some of these terminals 11a, 12a, 13a are shown. However, what is important is that the majority of the terminals are formed as AMP network nodes 13a. Further, a smaller number of terminals are formed as BMP network nodes 12a, and one terminal is formed as an MPP network node 11a. The BMP network nodes 12a and MPP network nodes 11a are interconnected via a wireless backbone communication chain. It is also significant that in the present case this backbone communication chain is formed approximately in a zigzag shape. This is achieved in that a BMP network node 12a, on the left side of the aircraft, and a BMP network node 12a which is downstream in the communication chain, on the right side of the aircraft cabin 20, are alternately provided. This then continues throughout the aircraft cabin 20 from front to back. In this way, i.e. by way of the zigzag communication connection formed in this manner, it is ensured that for all AMP network nodes 13a at least one superordinate network node 11a, 12a, for example a BMP network node 12a, with which these AMP network nodes 13a can communicate via the wireless communication connection 16c, is located nearby.

FIG. 2 further shows that various AMP network nodes 13a are also able to communicate with different BMP network nodes 12a of the network level 12 above. This is not excluded by the data communication protocol, and is even advantageous for reliable and robust data communication, since if a superordinate BMP network node 12a has failed, the data communication can take place via another BMP network node 12a.

In the embodiment of FIG. 2, merely by way of example, a single MPP network node 11a is shown which acts as a gateway to systems which are external to the network. Needless to say, it is also possible to provide more than just one MPP network node 11a in the wireless backbone communication chain, and this is advantageous in particular in relation to redundancy and safeguarding against failure.

Figure 3:
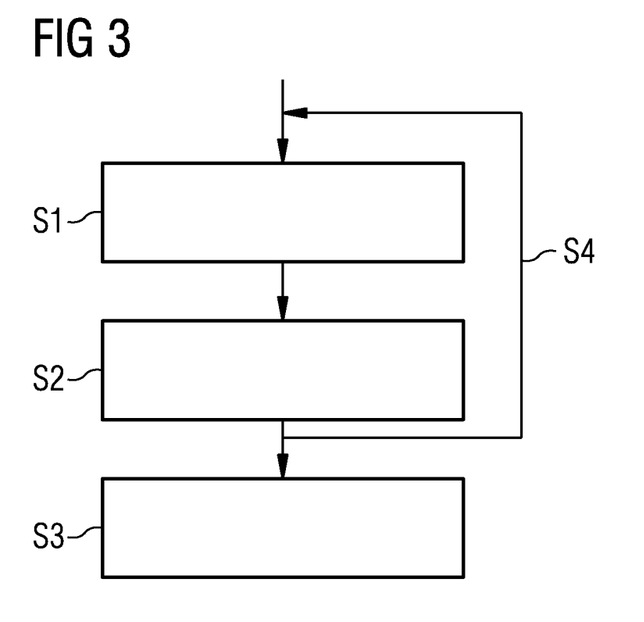
FIG. 3 is a flowchart illustrating a method according to the invention for operating a mesh network according to the invention.

FIG. 3 is a flowchart illustrating a method according to the invention for operating a mesh network.

According to the invention, discontinuous data transmission is provided so as to distribute the data, for example control data, address data or items of data information, to the respective network nodes for better treatment within the mesh network 10. This discontinuous data transfer is based on the principle of buffering and transmitting, whereby data from a superordinate network node are initially received and buffered, before subsequently being transmitted to an adjacent network node. The method described below comprises the following steps:

Step S1

In the first step, the BMP network node 12a, which is arranged alongside an MPP network node 11a, receives data. These received data are supplied to the BMP network node 12a via an external interface 15 and to the MPP network node 11a.

Step S2

Once this data transfer to the BMP network node is complete, this BMP network node 12a transmits the data to the closest possible adjacent BMP network node 12a.

Step S3

If each BMP network node 12a of the second network level 12 has the data which are coupled in via the external interface 15, all of the BMP network nodes 12a each individually transmit these data to corresponding AMP network nodes 13a in the backbone chain. This provides that all of the AMP network nodes 13a receive the respective data at the same time.

The data are transferred from the BMP network nodes 12a to the AMP network nodes 13a simultaneously and in parallel with the data transfer within the backbone communication chain, and this reduces the total data transfer time in the mesh network. The method just described is thus distinguished by a very high time efficiency for the data transfer.

In this case, "simultaneously" means that a network node 12a of the central level 12, which node has already completely received and transmitted the data, transfers said data to its own "clients" while the other transfers continue in the central plane 12.

If the mesh network has more than three network levels 11-13, all of the central network levels 12 act as BMP network levels 12. The BMP network nodes 12a provided therein receive the data in accordance with steps 1 and 2. Step 3 is only carried out when all of the BMP network nodes 12a of the lowest BMP network level 12 have complete data.

The present invention is not limited to the above concrete or abstract embodiments, but can be modified in any desired manner without departing from the subject matter of the present invention.

Throughout the description, the terms front, back, left and right relate to the flight direction or the orientation of an aircraft.

In relation to the hierarchy of the network levels or network nodes, the terms high and low always refer to higher-ranking or lower-ranking network levels or network nodes.

Although the present invention was disclosed in the above by way of a data communication network formed as a mesh network in an aircraft cabin, said network having precisely three network levels, the invention is not limited thereto, but can advantageously also be implemented for example with only two network levels or with more than three network levels. In particular, it would be conceivable in very large passenger aircraft, which for example also have a plurality of passenger decks, that more than three network levels could potentially be provided, so as to provide even more flexible, more effective, and above all more rapid data communication between the different network levels of the communication network. In particular, the number of network levels within the hierarchy of the communication network is thus substantially geared towards the total number of network nodes which are used, and thus in particular towards the number of terminals which are provided in the aircraft cabin or of passengers who make use of network nodes of this type or the corresponding terminals.

Although the present invention is disclosed in connection with a commercial aircraft formed as a passenger aircraft, the invention is not limited thereto, but could also advantageously be used in other aircraft. Use of the invention is also conceivable in other vehicles having entertainment systems of this type, such as modern buses for passenger transportation, passenger ferries, train cabins and the like. Communications means of this type could also conceivably used in entertainment systems in the waiting rooms of stations, airports or the like.

Although it is advantageous for the network nodes of the different network levels to be arranged in the form of a backbone chain, the invention is not limited thereto. Rather, it would be conceivable for the different network nodes to be arranged in some other way, and not necessarily in a continuous chain-like data communication connection in relation to one another. In particular, it would also be conceivable for the different network nodes within a network level to be formed so as to be cross-linked to one another, and this makes possible more flexible and more effective data communication of the different network nodes of a network level, and ensures, in particular if a network node fails, that the data communication between the network nodes of a respective network level is maintained.

In the present description, it has always been assumed that merely the network nodes of the highest network level comprise an interface to a communication means, which is external to the network, of the aircraft. However, this is not a compulsory requirement. Rather, it would also be conceivable for some or even for all of the network nodes to comprise an interface of this type, which at least offers the possibility of communicating with a communication means which is external to the network, it still being possible in this case for the communication to be limited to merely transmitting and/or receiving status information. In this way, the communication means external to the network could be informed very rapidly that some network nodes for example have restricted functionality or have even failed.

LIST OF REFERENCE NUMERALS 10 mesh network
11 first/highest network plane
11a gateway network nodes, MPP network nodes
12 second/central network level
12a base network nodes, BMP network nodes
13 third/lowest network level
13a end network nodes, AMP network nodes
14 aircraft systems
15 interface
16a-16c wireless communication connections
17 backbone communication chain, backbone network
20 aircraft cabin
21 aisles
22 rows of seats
S1-S4 method steps

The invention claimed is:

1. A method for data communication between network nodes of a static, hierarchical mesh network, constructed with a dynamic configuration, in a vehicle, comprising steps of:
   (a) providing data which are coupled into a highest network level via an external interface and which are intended to be transmitted to network nodes of a lowest network level (b) transmitting the data to a first network node of a central network level, which first network node is adjacent to the highest network level, until said first network node has received all of the data;

(c) transmitting the data from the first network node of the central network level to at least one second network node of the same central network level, which second network node is adjacent to the first network node until said second network node has received all of the data;

(d) repeating step (c) until all of the network nodes of the central network level have received the data; and (e) simultaneously with steps (a) to (c) transmitting the data from the network nodes of the central network level to the network nodes which are respectively associated with said nodes in the lowest network level.

2. The method according to claim 1, wherein the network nodes of different network levels are formed so as to be physically identical and logically different.

3. The method according to claim 1, wherein the logic of the network nodes is adjustable.

4. The method according to claim 1, wherein network nodes which are in data-communicating connection with one another, of at least one network level form a wireless backbone network.

5. The method according to claim 1, wherein network nodes which are in data-communicating connection with one another form a chain-like data communication connection in each case, the network nodes of the first network plane being arranged as centrally as possible in a respective chain-like data communication connection.

6. The method according to claim 1, wherein at least one network node of a subordinate network level has a wireless data-communicating connection to at least two different network nodes of a network level which is correspondingly superordinate.

7. The method according to claim 1, wherein a first, highest network level comprises at least two network nodes.

8. The method according to claim 1, wherein the mesh network comprises three or more different network levels:
a first, highest network level comprising at least one gateway network node, via which the mesh network can be coupled to systems which are external to the network,
a second, central network level comprising a plurality of base network nodes for transmitting received data, and
a third, lowest network level comprising a plurality of end network nodes, which each form wireless data-communicating connections with at least one base network node.

9. The method according to claim 8, wherein the end network nodes of the third network level are arranged evenly distributed in the cabin layout, and wherein the base network nodes of the network levels which are arranged above within the cabin layout are arranged in such a way that a data-communicating connection between the base network nodes and the end network nodes can be constructed with a minimum number of base network nodes.

10. The method according to claim 1, wherein the network nodes each receive and/or transmit data by means of an independently operating transceiver.

* * * * *